Feb. 11, 1941.    B. S. WRIGHT ET AL    2,231,239
COWLING EXHAUST OUTLET
Filed May 16, 1939    2 Sheets-Sheet 1

INVENTORS
BURDETTE S. WRIGHT and
DONOVAN R. BERLIN.
BY
ATTORNEY

Feb. 11, 1941.  B. S. WRIGHT ET AL  2,231,239
COWLING EXHAUST OUTLET
Filed May 16, 1939  2 Sheets-Sheet 2

INVENTORS
BURDETTE S. WRIGHT &
DONOVAN R. BERLIN.
BY
ATTORNEY

Patented Feb. 11, 1941

2,231,239

UNITED STATES PATENT OFFICE 2,231,239

COWLING EXHAUST OUTLET

Burdette S. Wright, Buffalo, and Donovan R. Berlin, Eggertsville, N. Y., assignors to Curtiss-Wright Corporation, a corporation of Delaware Application May 16, 1939, Serial No. 273,870

1 Claim. (Cl. 244—53)

This invention relates to aircraft and is concerned with improvements in the streamlining of exhaust outlets for the engines used therein.

The conventional practice in aircraft comprises the installation of an internal combustion engine within a streamlined body, fuselage, or nacelle, and, since the aircraft engine issues a large volume of hot exhaust gas, it is necessary to conduct this gas to a point outside the body for discharge to the atmosphere. In ordinary practice, the exhaust manifold comprises a pipe of a size appropriate to the size of the engine, which extends outwardly beyond the body or engine cowling surface whence it is bent rearwardly to open to the atmosphere so that the exhaust gas issues in the same direction as the air passing the body, to blend with the latter. Although these projecting exhaust manifold extensions are usually smoothly curved to offer minimum head resistance, they do set up an unnecessarily high drag and the manifold exit opening is usually so disposed, close to the body surface, that the exhaust gas is blown against the body surface causing soiling thereof. If the manifold opening is spaced sufficiently from the body surface to avoid this soiling, the manifold is likely to cause excessive drag.

It is an object of this invention to provide an exhaust manifold arrangement in which the manifold opening may be held close to the body surface, and to provide means in connection therewith whereby fresh air is formed as a blanket around the exhaust gas stream to prevent its impingement upon the body surface and also to blend the exhaust gas into the passing airstream in such a manner as to reduce the drag which may be caused thereby. A further object is to provide a streamlined fairing or covering for a projecting exhaust manifold by which the drag of the manifold extension is substantially reduced. Still another object is to provide means in connection with such a fairing by which fresh air is admitted to the interior of the fairing to surround the manifold extension and to insue from the fairing in a blanketing layer around the exhaust gas stream. A further object comprises the provisions of suitable openings by which cooling air utilized for the cooling of aircraft engines may be ejected around exhaust manifold extension to issue from a manifold embracing fairing as above indicated. A still further object comprises a provision of particular forms of manifolds and fairings appropriate to different sorts of engine installations.

Further objects will become apparent in reading the annexed detailed description in connection with the drawings in which, Fig. 1 is a side elevation of an aircraft body, indicating that type adapted for use with a radial cylinder air-cooled engine;

Figure 1:
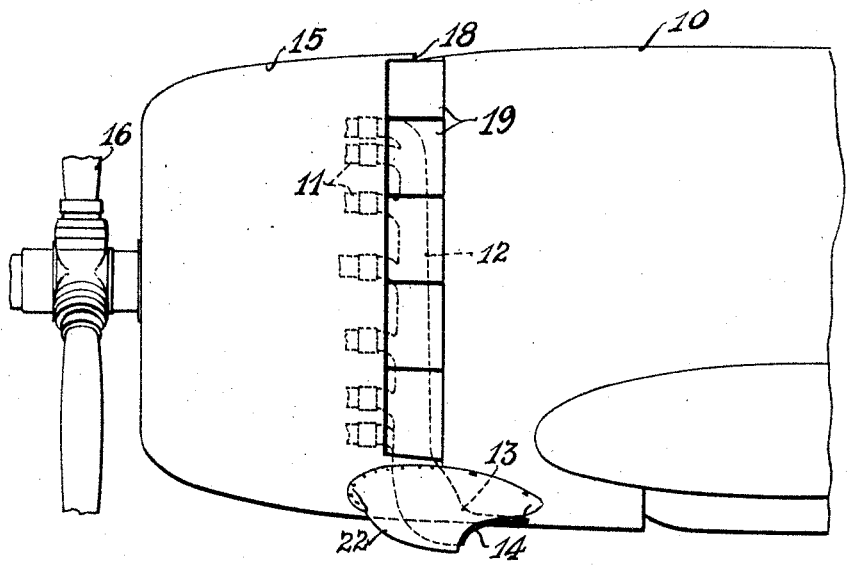
Figure 2:
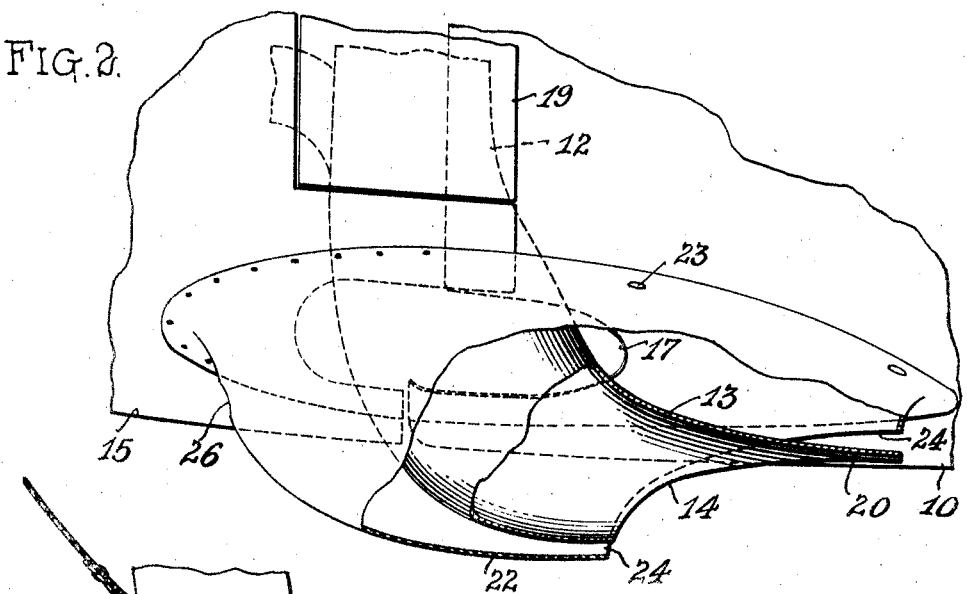
Fig. 2 is an enlarged fragmentary elevation, partly in section, showing the improved exhaust manifold construction.
Figure 3:
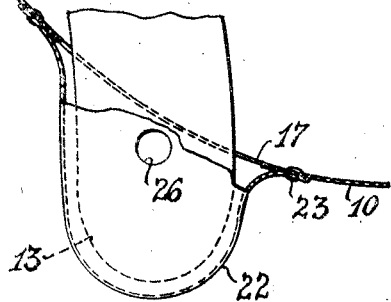
Fig. 3 is a front elevation, in partial section, of the manifold and fairing.

Referring first to Figs. 1, 2 and 3, an aircraft body, nacelle or fuselage is shown at 10, upon the forward end of which is mounted in the conventional manner a radial cylinder air-cooled engine provided with exhaust outlets 11 connected into an exhaust manifold 12, the latter terminating at its lower end in a rearwardly turned elbow 13 open at its rearward end as at 14. The engine is normally embraced by a cowling 15 ahead of which the propeller 16 is mounted on the engine propeller shaft. The elbow 13 extends outwardly beyond the surface of the cowling 15, passing through an opening 17 with which the surface of the elbow has clearance relation, as shown. As in conventional practice, the exhaust manifold 12 is in a region behind the engine which comprises a compartment into which cooling air flows from the engine cylinders, not shown. This compartment is ordinarily provided with an annular or segmental air exit such as 18 and control of the effective area of this slot is afforded by means of adjustable flaps such as 19. It will be noted that the manifold is disposed reasonably close to the slot 18 and the issuance of the elbow 13 from the body surface is from the zone rearward of the engine.

Referring to Fig. 2 particularly it will be noted that the elbow 13 has a rearwardly extended inner lip 20 extending along a portion of the body surface in substantially parallel relation thereto, this lip forming a guiding surface for issuing exhaust gas to prevent its immediate and direct dispersion against the body surface. Embracing the extending portion of the elbow 13 is a streamlined fairing 22 secured to the body surface as by rivets or the like 23.

The fairing is of streamlined form as shown and open at its rearward end to allow of exhaust gas issue, the opening 24 of the fairing being of somewhat larger size than the rearward opening of the exhaust elbow 13. The fairing may also be provided with a forward opening 26 for the admission of fresh air. When the aircraft is in flight exhaust gas issues at high velocity from the elbow 13 to the atmosphere and also, fresh air enters the fairing through the opening 26 and some of the air which has passed over the engine finds its way through the body opening 17 into the interior of the fairing. Such air envelopes the elbow 13 and passes from the fairing through the opening 24 between the fairing and elbow end, to provide a directed stream of air which forms a blanket surrounding the jet of exhaust gas. Preferably, the effective area of the opening of the elbow 13 is such as to provide an exhaust gas velocity somewhat in excess of the velocity of slip stream air passing over the fuselage, whereby the issuing exhaust gas provides a sort of booster by which the speed of the aircraft may be slightly increased. However, such jet action is not particularly effective unless turbulence of the exhaust gas is suppressed by which airflow rearward of the exhaust opening is smoothly blended with the slipstream. The blanket of cool air issuing from the fairing and surrounding the exhaust gas jet has been found to be an effective means of blending the exhaust gas jet with the atmosphere and it also serves the function of providing an insulating layer between the exhaust gas jet and the body surface by which the soiling of the fuselage surface is substantially avoided. In this connection, the conventional open exhaust stacks or elbows of the prior art may have their openings spaced from the fuselage surface, but without a suitable fairing and air guiding means embracing them, eddy currents of air are likely to be formed rearward of the exhaust outlet and between the outlet and the body so that an effective layer of air between the exhaust jet and the body is lacking. The fairing 22 provides guiding means by which the desired layer of clean air is provided between the exhaust jet and the body surface.

Figure 4:
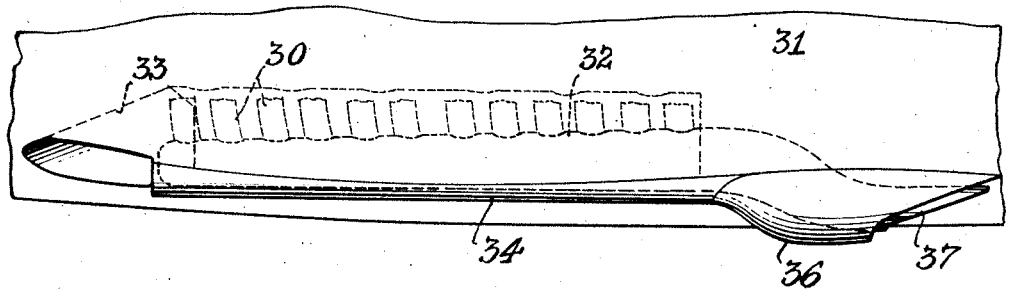
Fig. 4 is a fragmentary plan of alternative structure adapted for use with "in-line" engines.
Figure 5:
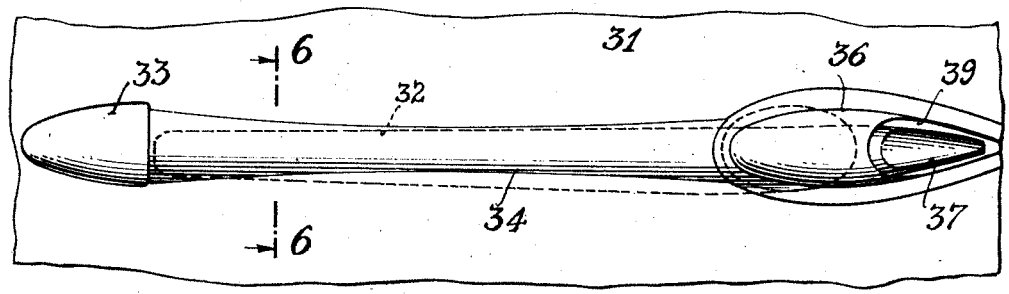
Fig. 5 is a side elevation of the structure of Fig. 4.
Figure 6:
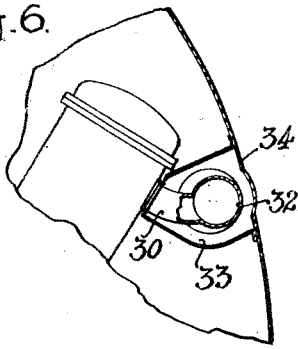
Fig. 6 is a fragmentary section on the line 6—6 of Fig. 5.

Figs. 4, 5 and 6 illustrate a manifold fairing and ventilating system following the principles above outlined but adapted for use with engines of the in-line type which comprise a plurality of longitudinally alined exhaust stacks 30 within the aircraft body 31 which are bridged by a longitudinally extending manifold 32 nested into a groove 33 in the body surface. This groove is covered by a longitudinal fairing 34 terminating short of the forward end of the groove 33 and having at its rear end, a streamlined protuberance 36 embracing the rearward open ended part 37 of the manifold 32, which at this point is outwardly offset to lie without the normal surface profile of the body 31. It will be seen that the fairing 36 and the end 37 are spaced from one another to provide a slot 39 around the manifold end and in flight, the forward end of the fairing 34, in conjunction with the forward end of the groove 33 acts as an air scoop to entrain air from the slipstream for passage around and along the manifold for issuance in a blanketing layer from the slot 39 and in embracing relation to the stream of exhaust gas issuing from the manifold end 37.

Thus, by the above structure, ventilation of the manifold is accomplished along with the provision of a blanketing layer of clean air embracing the exhaust gas jet.

Figure 7:
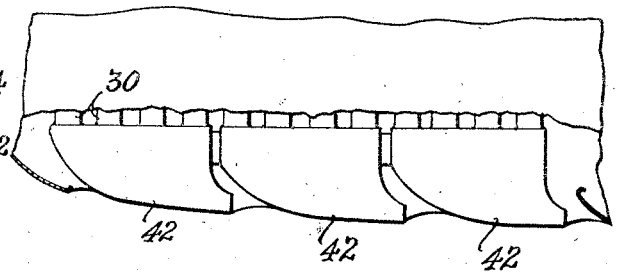
Fig. 7 is a diagrammatic fragmentary plan of an alternative arrangement.

In Fig. 7 an alternate arrangement is shown in which a plurality of group manifolds 42 are utilized, each serving a plurality of the individual engine exhaust stacks 30, and it is contemplated in this embodiment, that ventilation of the individual manifolds be provided and that issuing of an insulating layer of air between the exhaust gas jet and the adjacent manifold or body surface be furnished as in the prior embodiments.

In actual use of the invention as above outlined, surprising and constructive results have been secured in that the use of the invention has substantially eliminated the soiling of the body surface common to previous types of manifolds and the speed of an aircraft on which the device has been installed is increased from 3½ to 5 miles per hour over an identical craft not equipped with the invention. A further advantage flowing from the use of the invention, which has been indicated, comprises the smooth blending without undue turbulence, of the exhaust gas into the slipstream surrounding the aircraft body. This gain affords complete freedom of exhaust gas diffusion into the aircraft cockpit and crew quarters which in some prior manifold arrangements has been an objectionable characteristic.

While we have described our invention in detail in its present preferred embodiment, it will be obvious to those skilled in the art, after understanding our invention, that various changes and modifications may be made therein without departing from the spirit or scope thereof. We aim in the appended claim to cover all such modifications and changes.

We claim as our invention:

In an aircraft body containing an air-cooled engine and having an opening rearward of the engine in a side surface through which spent engine cooling air may flow, an exhaust pipe extending through the opening in clearance relation to the opening edges and smoothly turned rearwardly outside of the body into substantial parallelism with the body surface, the rearward end of said pipe being spaced outwardly from the body surface, a domed fairing enclosing that part of the pipe which lies without the body, the fairing wall being spaced from the pipe at all points and, at its sides, extending out from the body throughout its length and extending to a streamlined rearward end substantially adjacent to the rearward end of the exhaust pipe, said fairing having a rearward opening substantially at and of larger size than the open rear end of the exhaust pipe, and means exterior of the body at the front of said fairing to introduce air into the fairing for rearward flow to the atmosphere through the rearward fairing opening around said exhaust pipe, said latter air being in addition to that spent engine cooling air entering the fairing from the body, said construction providing a blanketing air layer around the column of issuing exhaust gas to prevent impingement of exhaust gas on the body surface and to blend said exhaust gas smoothly, with minimum turbulence, into the airstream.

BURDETTE S. WRIGHT.
DONOVAN R. BERLIN.